(12) United States Patent
Lyle et al.

(10) Patent No.: US 8,140,619 B2
(45) Date of Patent: Mar. 20, 2012

(54) MANAGEMENT OF COMMUNITY BUDDY LISTS

(75) Inventors: Ruthie D Lyle, Durham, NC (US); Allen E Milewski, Holmdel, NJ (US); David M Ogle, Cary, NC (US); Patrick J O'Sullivan, Dublin (IE); Abdelghafour Saidi, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 11/835,494

(22) Filed: Aug. 8, 2007

(65) Prior Publication Data

US 2009/0043843 A1    Feb. 12, 2009

(51) Int. Cl.
*H04L 1/12* (2006.01)

(52) U.S. Cl. .................. 709/204; 709/206; 709/217

(58) Field of Classification Search .......... 709/204–206, 709/207
See application file for complete search history.

(56) References Cited

U.S. PATENT DOCUMENTS

| 7,412,527 | B2 * | 8/2008 | Pulver et al. ................. 709/229 |
| 7,593,925 | B2 * | 9/2009 | Cadiz et al. ............................ 1/1 |
| 7,600,258 | B2 * | 10/2009 | Desouza et al. ................ 726/24 |
| 2004/0044536 | A1 * | 3/2004 | Fitzpatrick et al. .............. 705/1 |
| 2004/0044738 | A1 * | 3/2004 | Ohno et al. ................... 709/206 |
| 2004/0122822 | A1 * | 6/2004 | Thompson et al. ........... 707/100 |
| 2007/0033196 | A1 * | 2/2007 | Moore ........................... 707/10 |
| 2008/0133677 | A1 * | 6/2008 | Pattabhiraman et al. ..... 709/206 |

\* cited by examiner

*Primary Examiner* — Hassan Phillips
*Assistant Examiner* — Thai Nguyen
(74) *Attorney, Agent, or Firm* — Jeffrey T. Holman

(57) ABSTRACT

One or more buddy lists from a first user's computer is populated on one or more other users' computers to cause a buddy list update of community buddy lists. The buddy lists may be auto-populated in response to a change in job status of the first user.

20 Claims, 10 Drawing Sheets

MANAGEMENT OF COMMUNITY BUDDY LISTS

BACKGROUND OF THE INVENTION

The present disclosure relates to the field of computers, and specifically to software. Still more specifically, the present disclosure relates to managing buddy lists for interactive teleconferencing sessions.

Interactive teleconferencing technology is used to communicate either to an individual via peer to peer chats, or to a group of individuals through establishing a group chat discussion where 1 to n (where "n" is an integer) individuals can join. Such teleconferencing has become an integral part of both personal and professional lives, and is often replacing and supplementing well known means of communication such as email, phone and face-to-face conversations. Examples of such interactive telecommunication (teleconferencing) include, but are not limited to, Instant Messaging (IM), video teleconferences, web conferences, conference telephone calls, and other similar electronic means of communication.

BRIEF SUMMARY OF THE INVENTION

One or more buddy lists from a first user's computer is populated onto one or more other users' computers to create a buddy list update. The buddy lists may be auto-populated in response to a change in job status of the first user.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE INVENTION

Figure 1:
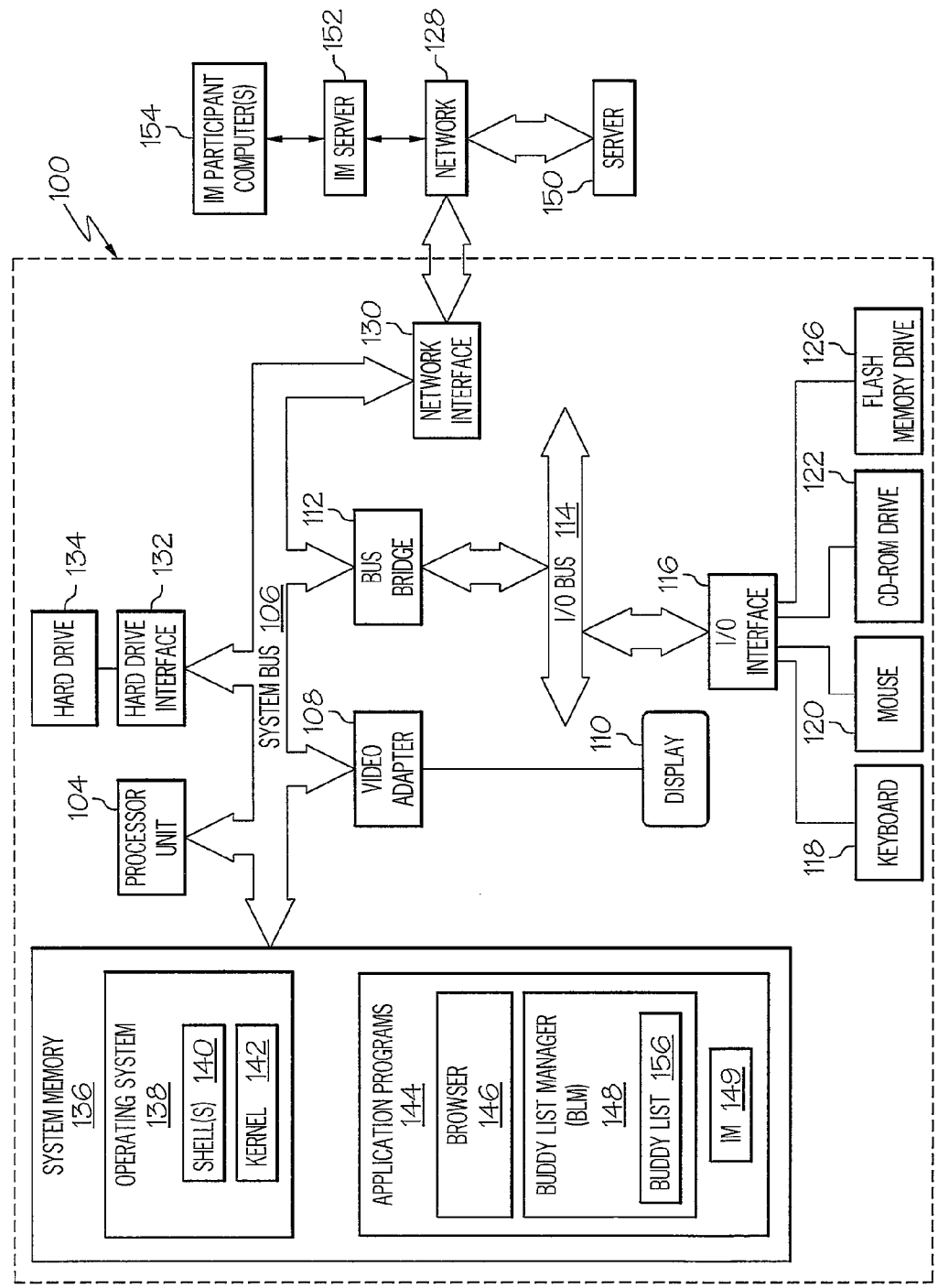
FIG. 1 depicts an exemplary computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150, an IM server 152, and IM Participant Computer(s) 154 via a network 128 using a network interface 130, which is coupled to system bus 106. Network 128 may be an external network such as the Internet, or an internal network such as an Ethernet or a Virtual Private Network (VPN). Server 150, IM server 152, and IM Participant Computer(s) 154 may be architecturally configured in the manner that is substantially similar to that depicted for computer 100. In a preferred embodiment, computer 100 is utilized by a first participant in an IM or similar interactive teleconference session, and IM participant computer(s) 154 are used by one or more other participants in the interactive teleconference session.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a Buddy list Manager (BLM) 148, which includes a buddy list 156. Buddy list 156 is a list of interactive communication session contacts, e.g., Instant Messaging contacts that are available to a user during an interactive communication session.

Application programs 144 also include an Instant Messaging (IM) program 149, which is any real-time interactive instant messaging program that affords the ability to communicate via Instant Messaging. BLM 148 and IM 149 perform the functions illustrated below in FIGS. 2-10. In one embodiment, computer 100 is able to download BLM 148 and/or IM 149 from a service provider that is utilizing server 150, preferably in an "on demand" basis. Note further that, in a preferred embodiment of the present invention, server 150 performs all of the functions associated with the present invention (including the execution of BLM 148 and/or IM 149), thus freeing computer 100 from having to use its own computing resources.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

The present invention may be utilized in any interactive teleconference environment. An interactive teleconference is understood to include any form of electronic communication between at least two parties and/or devices. Examples of such interactive teleconferences include, but are not limited to, Instant Messaging (IM) sessions, web conferences, video conferences, telephone calls, text message sessions, etc. While it is to be understood that the novelties disclosed herein are applicable to any such interactive teleconference environments, for the sake of brevity and clarity, the invention is primarily described herein in the environment of text-based Instant Messaging.

Figure 2:
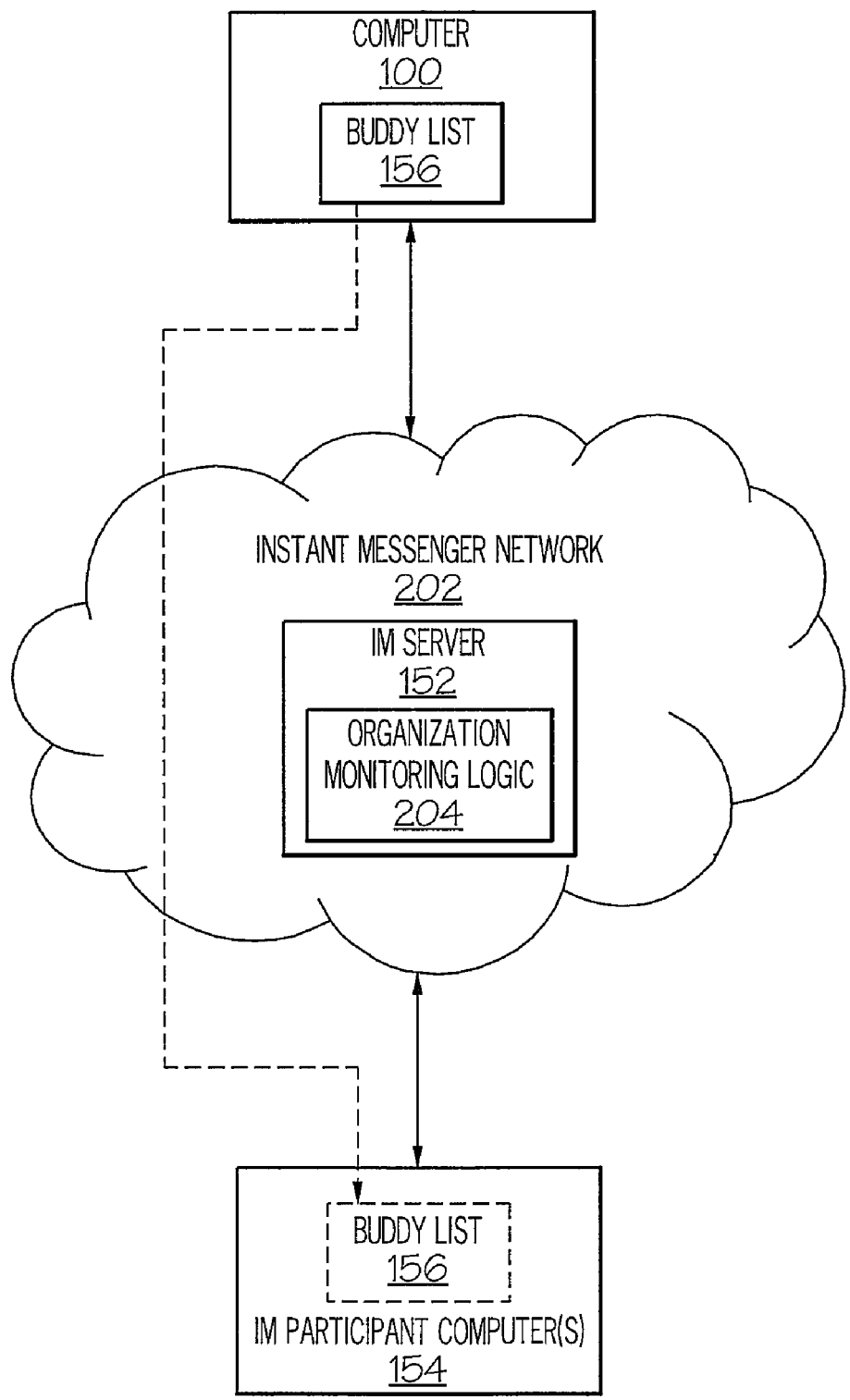
FIG. 2 illustrates a relationship between two Instant Messaging (IM) participant computers.

With reference now to FIG. 2, an overview of a relationship between a computer 100, having a buddy list 156, and other IM participant computer(s) 154 (all described in FIG. 1). Computer 100 communicates with the other IM participant computer(s) 154 via an IM network 202, which includes the IM server 152 described in FIG. 1. For purposes described below, in one embodiment the IM server 152 includes an organization monitoring logic 204, which includes software logic for monitoring any changes that may occur to a status of an IM user, thus provoking a propagation event that causes a change to IM buddy lists in one or more IM computers. As indicated by the dashed arrow, in accordance with the embodiments described below, the buddy list 156 will be sent from the computer 100, which originally had stored the buddy list 156, to the other IM participant computer(s) 154 in response to some propagation event.

Figure 3:
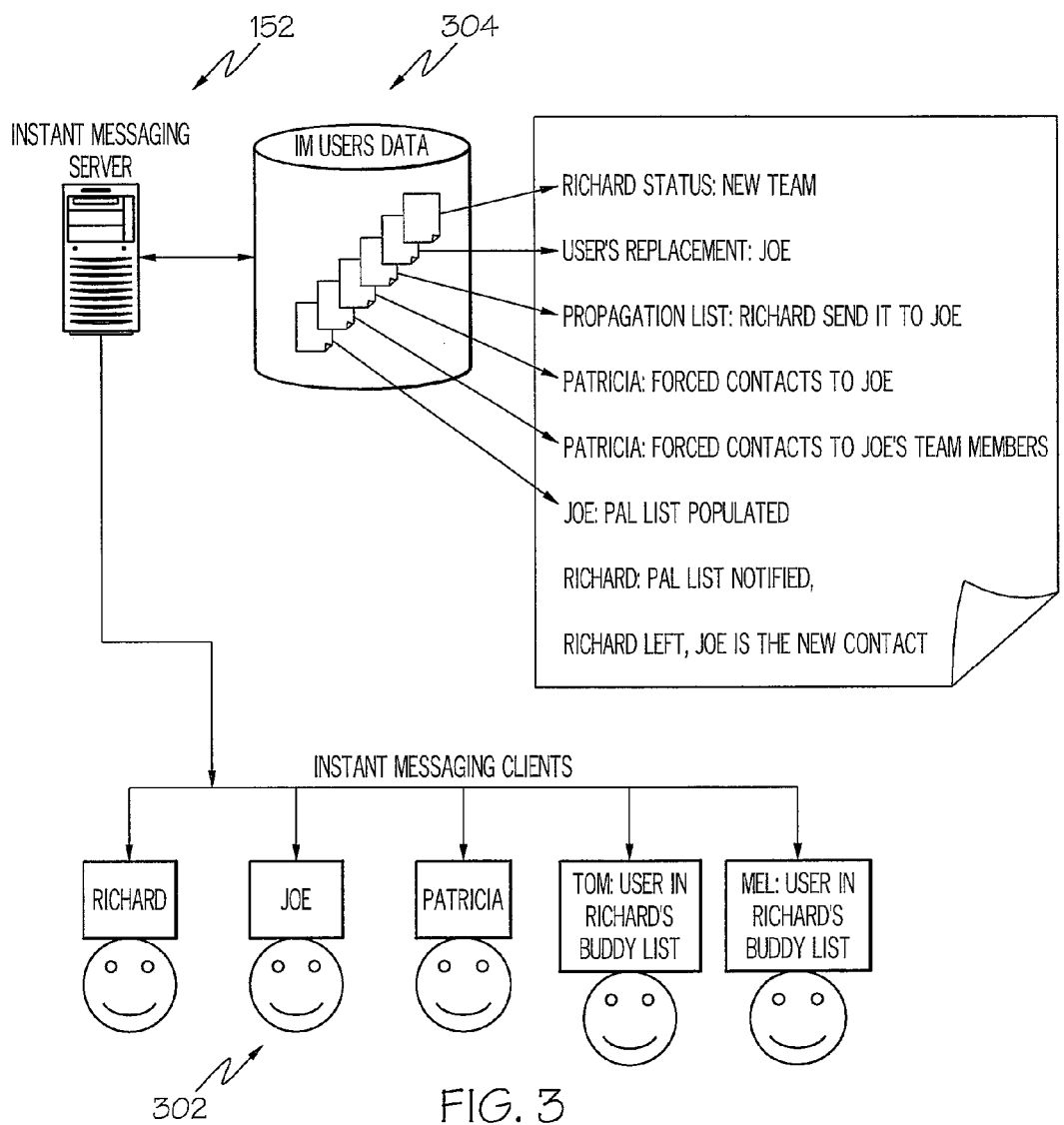
FIG. 3 depicts additional detail for an IM server used to support IM users.

Referring now to FIG. 3, additional detail is shown to describe the relationship between the IM server 152 and IM clients 302. In an exemplary embodiment, IM clients 302 are human users or IM interfaces that are utilizing the IM participant computer(s) 154 and/or computer 100 described in FIG. 1. IM server 152 has access to an IM users' database 304, which may be stored locally in the IM server 152 or in computer 100 or IM participant computer(s) 154. Note the exemplary descriptors for various IM clients 302, in which relationships and IM buddy list propagation history/rules are described. For example, IM users' database 304 contains data that describes "Richard" as having left his current team to go to a "New Team." "Richard" will be replaced on the old team by "Joe." Thus, in an exemplary embodiment described below, the IM buddy list that Richard previously had can now be propagated to "Joe." Included in this propagated IM buddy list are "Tom" and "Mel," whose contacts and identities are now part of "Joe" IM buddy list. Similarly, "Patricia's" IM buddy list has a rule that it can be "forced" onto "Joe's" computer and his team members.

Besides rules and roles described above, historical data can also be stored in IM users' database 304. For example, "Joe's" IM buddy list ("pal list") has a record of having been populated by "Richard's" IM buddy list, that "Richard" has been so notified, and that "Richard" has left the team, making "Joe" the new IM contact for the old team.

Figure 4:
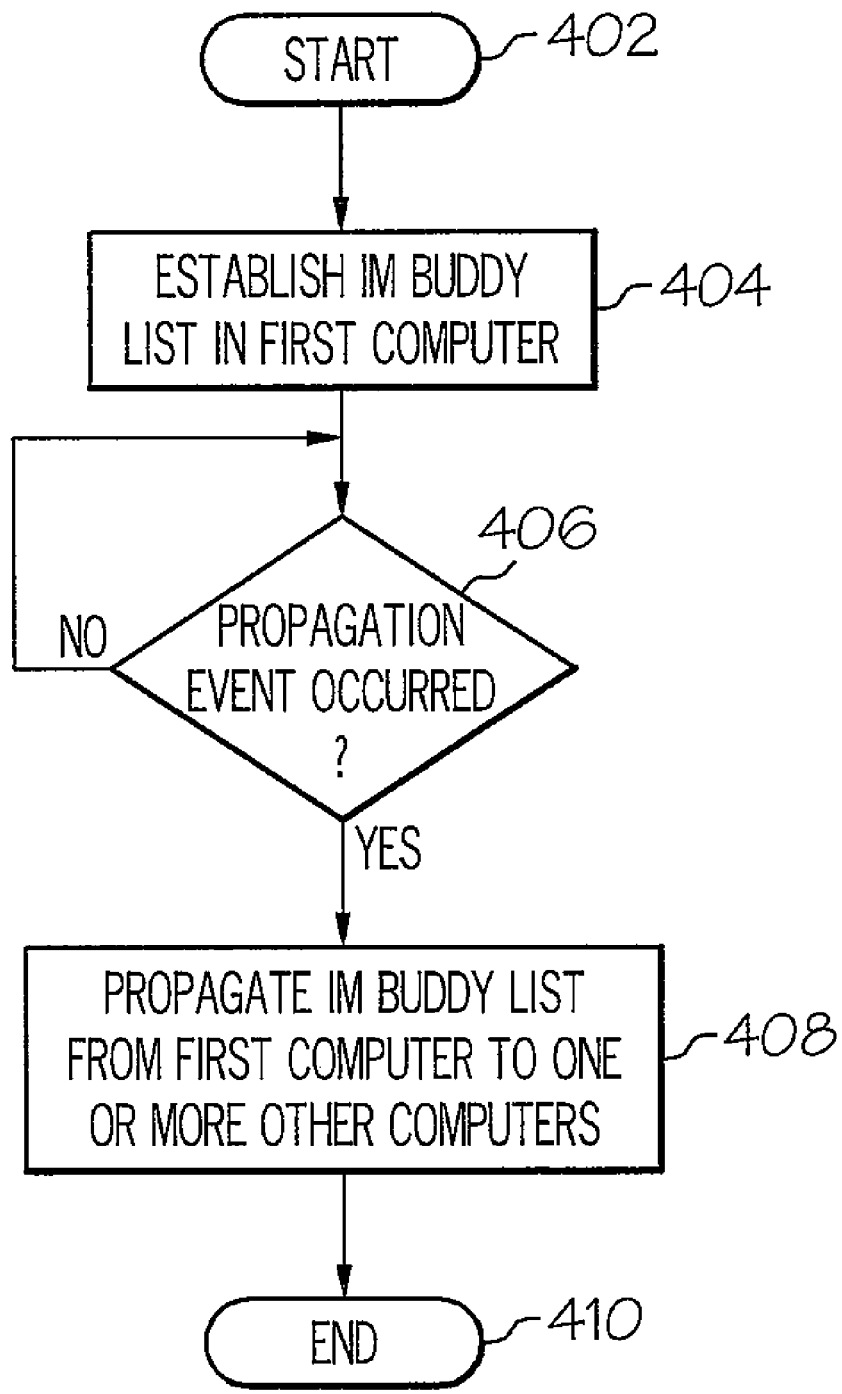
FIG. 4 is a high level flow-chart describing exemplary steps taken to manage IM buddy lists.

FIG. 4 presents a high-level flow-chart of exemplary steps taken in the present invention to propagate an IM buddy list. After initiator block 402, an IM buddy list is established on a first computer (block 404). Thereafter, a query is made (query block 406) to determine if a propagation event has occurred. This propagation event may take on many different forms, including: a change to a Service Level Agreement (SLA) that describes which persons can be contacted by a customer through IM (e.g., the SLA defines what contacts should be available to a customer, and/or the SLA defines what customers should be immediately available to a service enterprise's employees via an IM buddy list); a change in hardware resources (e.g., hardware resources may require certain service personnel to be on a same buddy list, and if the hardware resources combine or otherwise change, then corresponding buddy lists must also be combined or changed such that the hardware resources can be properly serviced); a change to enterprise security rules (e.g., which persons can use IM and in which buddy groups); an "owner" of an IM buddy list being transferred to a different project, work group, or company (including leaving his employment with a current enterprise); a change to an enterprise's organization; a promotion/demotion of individuals such that they now need and/or are authorized for more/fewer buddy contacts; a second user requesting a buddy list from a first user (who has the buddy list), etc. For exemplary purposes, these propagation events are described below in detail with respect to a change in an employee's status, job, and/or role in an enterprise. In one embodiment, the monitoring for such propagation events is performed in the IM server, which can periodically analyze an organization chart (e.g., a Lightweight Directory Access Protocol—LDAP tree; a standard branching organization chart; etc.) to see if a change to an IM user's status has occurred (e.g., according to a rule found in the IM users' database 302). If such a propagation event does occur, then the IM buddy list from the first computer is propagated (transmitted) to one or more other computers that utilize IM (block 408). The process ends at terminator block 410.

As described herein, the method for enhancing Instant Messaging (IM) with a System and Method for Deterministic and Autonomic Management of Buddy Lists may be utilized in many different scenarios, thus making the population of buddy lists quicker, relevant and instant. This process is particularly useful when managing the daily work for new users, people change projects, and ensuring that people who should be aware of the change are made so. Exemplary scenarios are as follows.

One to One Peer to Peer Propagation:

In this scenario, assume that Richard is leaving a particular job (e.g., will no longer be an employee of an enterprise, is leaving a particular job within an enterprise, etc.) In such a scenario, and as described further below, Richard opens a propagation menu from his Instant Messaging client and sends contacts (i.e., his IM buddy list) to Joe, who will have his IM buddy list populated. By doing this Richard is sure that Joe has all the relevant contacts in his list for his daily job.

One to Multiple Propagation:

In this scenario, Richard is leaving his job, as described above, and opens the propagation menu from his instant Messaging client. Now, however, instead of just sending his IM buddy list to a single other user, Richard sends his IM buddy list contacts to multiple people. These multiple people are "relevant people," who meet some type of criteria for receiving Richard's IM buddy list. Examples of such criteria include, but are not limited to, members of Richard's current work team, replacement workers or teams who will be taking over all or select clients and jobs that Richard worked with, etc. By doing this, Richard is sending his contacts to all the relevant people in his team who will more likely need those contacts in day to day projects.

New Employee List Propagation:

In this scenario, when new employee Joe joins the organization, his list is automatically populated with the relevant people (e.g., his team members, his manager, his customers, etc. By auto-populating his IM buddy list, Joe will be aware of the different people working with him and will not have to propagate this vital information manually (which delays his integration schedule into the work team, can result in lost contact information, etc.).

Forced Propagation:

In one embodiment, forced propagation of all types is secured by settings in an IM server that give specific users power to force propagation on all users or part of the users. For example, such a setting may give persons with the title "General Manager" the authority and ability to force propagation of IM buddy lists onto specified users who are under their management and direction.

For exemplary purposes, assume that Patricia, Joe's manager, sends a propagation IM buddy list to Joe. This IM buddy list will then be added to Joe's IN buddy list ("forced propagation") without Joe being asked if he accepts or not. Rather, he is simply informed of the event. Patricia can also send a contact to all IN users on her team and they are forced to accept it. This scenario allows managers to make sure that people reporting to them have the right set of contacts in their IM buddy list.

Propagation, Full or Partial Accept:

In this scenario, assume that Richard sends a list of contacts to Joe, but that Joe has the right to accept the full list or to accept only selected contacts. This embodiment allows Joe to accept only the contacts that he thinks are relevant to his work. Furthermore, this scenario allows Joe to reject IN buddy contacts who are already on his IM buddy list.

Propagation, Automatic Accept:

In this scenario, Joe can give rights to specific users to add propagate contacts directly to Joe's list. By doing so, when Richard send a list of contacts to Joe, Joe's list will be automatically populated with the contacts without Joe having to manually accept the changes to his IN buddy list(s).

Propagation, Automatic Notification:

In this scenario, assume that Richard is permanently leaving his employment with the organization. All users who have Richard in their IM buddy list will receive a message telling them that Richard has left and Joe has replaced him. The message will also include options (described below) for how the receiver would like to update his contact list (e.g., replace Richard's contact information with Joe's contact information). By doing this, the users' lists in the organization will be automatically kept up to date.

Propagation, Users Groups:

In this scenario, when a user receives a propagation list, he is asked if he wants to keep the exact groups in the list received, or merge groups with specific groups, thus allowing the receiving user the flexibility in managing IM buddy lists for different tasks/organizations/groups. By taking these steps, the receiving user has better flexibility in putting specific users within specific groups.

Propagation, Pending:

In this scenario, the user can suspend the propagation request and deal with it at a later time. That is, rather than automatically updating the receiving user's IM buddy list(s), the updates are placed in a "holding queue," from which the receiving user can deal with the issue at a later time. Thus, a new user, who is receiving many propagation requests, may prefer to have them in pending mode until he defines his groups names, determines which groups he will actually be part of, etc.

Propagating and Retrieving List from User:

In this scenario, the IM system (e.g., the IM server 152) has an option to view and retrieve the buddy list contents of another user. This is particularly useful in those cases where colleagues are not as thoughtful and proactive as in the scenarios listed above. For example, X joins a team and is really curious about the IM contacts that are important for his work. In the present scenario, s/he can request the buddy list contents of another team member. This can be done by users pre-authorizing others to view and retrieve their IM buddy list contents, or it can be done by "on-the-fly" authorization (e.g., the receiving user receives an IM saying "X is requesting to view your IM buddy list, respond 'yes' to give permission").

Propagation, Standard Media:

In this scenario, the IM system has an option to convey the IM buddy list information via a media other than the IM system itself. That is, users have the option to email an IM buddy list object to another user. The scenario is particularly useful when the user wishes to propagate his IM buddy list information to someone who is not on the same IM server—possibly even not using the same service. For example, assume that X begins working closely with a customer whom, he feels, would benefit from being connected with members of the development team. The customer specifies that the IM buddy list information is to be sent to him via e-mail. When the e-mail arrives, the recipient can simply click on the attachment, and the IM client will execute and load the IM buddy list (locally on itself or at the IM server).

Autonomic Management:

In this scenario, IM buddy lists are autonomically managed in various scenarios. For example, passively absorbed organizational changes can be based on policy rules such that when individuals leave, when individuals join, when teams change, etc., IM buddy lists are updated for a plurality of individuals in an autonomic way. In another scenario, assume that the individuals/teams may or may not change, but their manager has changed. In this case, autonomic changes take place such that new managers inherit the rights to propagate/manage buddy lists for their team and old rights associated with previous managers are revoked (or reassigned to new users/groups where applicable).

Note that the application of any or all of the above-described scenarios may be extended to include cases where employees (IM users) are affiliated with different community servers (e.g. crossing gateways).

Figure 5:
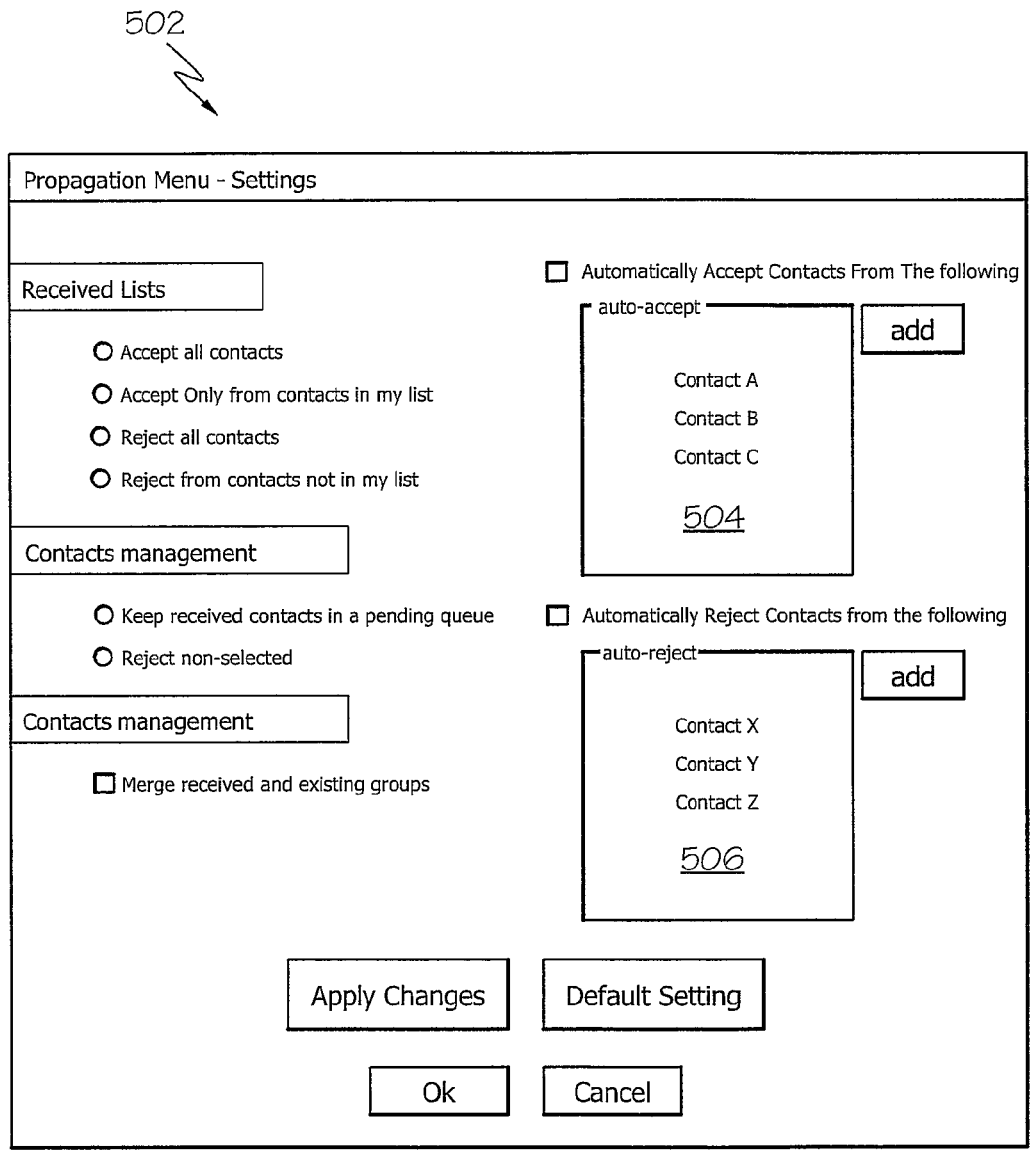
FIG. 5, illustrates a Graphical User Interface (GUI) for setting rules regarding received propagation of IM buddy lists.
Figure 6:
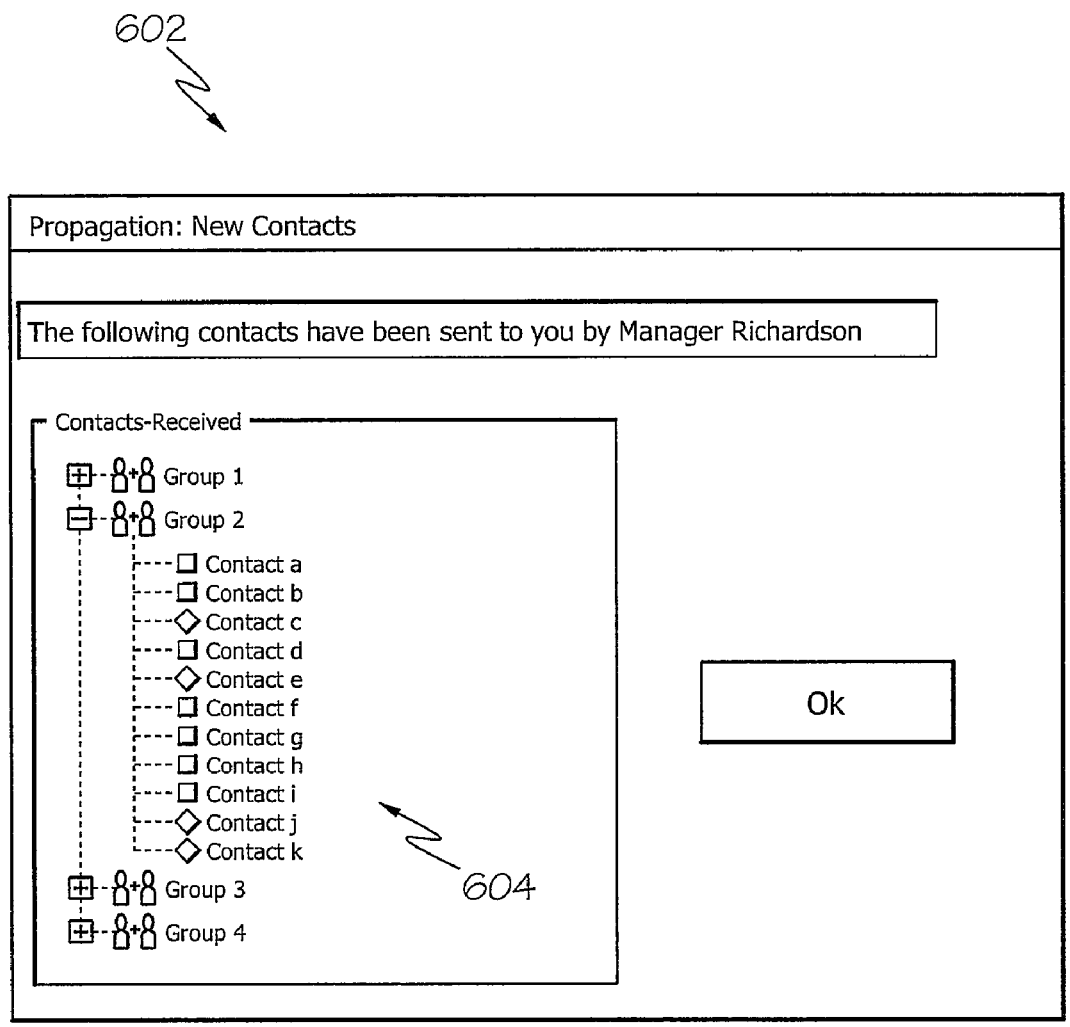
FIG. 6 depicts a GUI for providing details of an IM buddy list has been received.

Referring now to FIG. 5, an exemplary GUI 502 for setting IM buddy list propagation settings is presented. Various presented options are described below:

Received Lists

"Accept all contacts"—If a user selects this option, all IM buddy list contacts will be accepted by default. When the user receives such contacts, a notification message is also sent to the user so notifying her that contacts have been added to here IM buddy list. Optionally, the notification message will describe which contacts have been added, to which particular IM buddy list (identified by name of the local IM buddy list), the sender of the contacts, when the contacts were sent, who authorized the IM buddy list, etc.

"Accept only from contacts in my list"—If a user selects this option, only contacts sent by users that are already in his local IM buddy list will be accepted. Thus, prior contacts found on the user's local IM buddy list "vouch for" the new contacts.

"Reject all contacts"—If a user selects this option, the all received lists of new IM buddies will automatically be rejected. In one embodiment, this option is overridden by higher ranked options. For example, if a rule states that this user has no choice in accepting new contacts from his supervisor, then contacts sent from that supervisor will auto-populate (by "forced propagation") that user's IM buddy list. Similarly, if the user has also selected the "Accept only from contacts in my list" option, then this option may, according to a pre-determined rule, override the "Reject all contacts" option, and allow the propagation of contacts sent from present contacts on the user's IM buddy list.

"Reject from contacts not in my list"—If a user selects this option, any contact sent from a party that is not currently on the local user's IM buddy list will be rejected. Again, a "forced propagation" or other rule may override this option.

Contacts Management

"Keep received contacts in a pending queue"—If a user selects this option, then whenever a new propagation request is sent to that user, some or all of the contacts are put into a queue. The receiving user is then able to view the pending queue at a later time to select which contacts she wishes to put into her buddy list.

"Reject none selected"—If a user selects this option, then whenever a new propagation request is sent to the user (i.e., an other IM user asks the local user to add the other IM user's contacts to the local user's IM buddy list), then the local user selects which contacts he wants, and the rest are automatically rejected and deleted.

"Merge received and existing groups"—If a user selects this option, then received new contacts in a named group are automatically merged into local IM buddy lists that have the same group name or are otherwise identified as being related. Thus, if the local user receives an entire IM buddy list named "Sales contacts," then the received/accepted contacts will auto-populate a local IM buddy list with the same ("Sales contacts") or similar (as identified by some relational logic such as that which recognizes synonyms, LDAP relationships, etc.) name.

In one embodiment, a user can simply allow the default "auto-accept" option to be in place, as shown in window 504. This auto-accept option is pre-defined by either the user or a supervisor. In one embodiment, the auto-accept option determines a relationship between the user and a sender of an IM buddy list. For example, logic controlling the auto-accept option (e.g., BLM 148 shown in FIG. 1) may read the user's identification from a Lightweight Directory Access Protocol (LDAP) tree, an organization chart, etc., and determine what the relationship between the user and the sender (of the IM buddy list) is. Assuming, for exemplary purposes, that the LDAP tree shows the user as being "under" the sender (e.g., is subordinate by job title), then the auto-accept option may determine, according to rules programmed into BLM 148, that the user is required to take whatever the sender gives her. Alternatively, the "auto-accept" option may allow the local user to list all users from whom buddy lists are acceptable ("Contact A," "Contact B," "Contact C"), and then to accept any incoming IM buddy lists ("propagation requests") received from those listed users.

Similarly, as shown in window 506, a user can elects to automatically reject any contact from a named user ("Contact X," "Contact Y," "Contact Z").

Propagation Requests Received

When a user receives a propagation request, he may be presented with multiple options. For example, as depicted in GUI 602 shown in FIG. 6, a local user (who is viewing GUI 602 on her computer) has had contact groups 1-4, which are depicted in LDAP tree 604, sent to the user by "Manager Richardson." Note that the receiving local user is able to expand each group to see who is in the group. Note also that some of the contacts in the Group 2 are denoted by diamonds or squares. These denotations identify some feature about the contact. For example, a diamond may denote that the contact is an "inside" contact (employee of the same enterprise as the local user), while the square may denote that the contact is an "outside" contact (e.g., a customer, vendor, etc.). For exemplary purposes, assume that all groups (and their contacts) are to be accepted, either by virtue of their being "forced" upon the local user by a superior, or having been "pre-approved" for acceptance based on a rule such as describe above.

Figure 7:
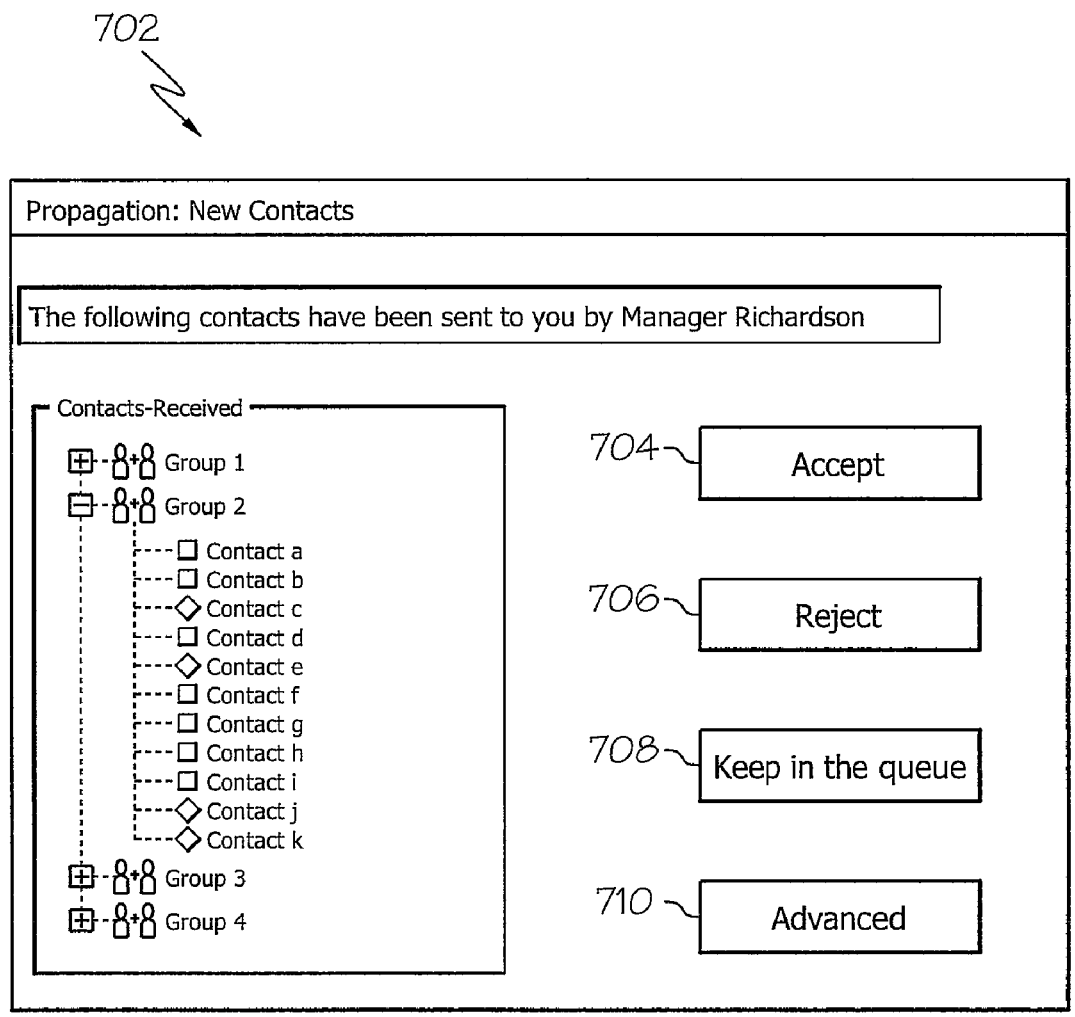
FIG. 7 illustrates a GUI that provides receiving options for a specific received IM buddy list.
Figure 8:
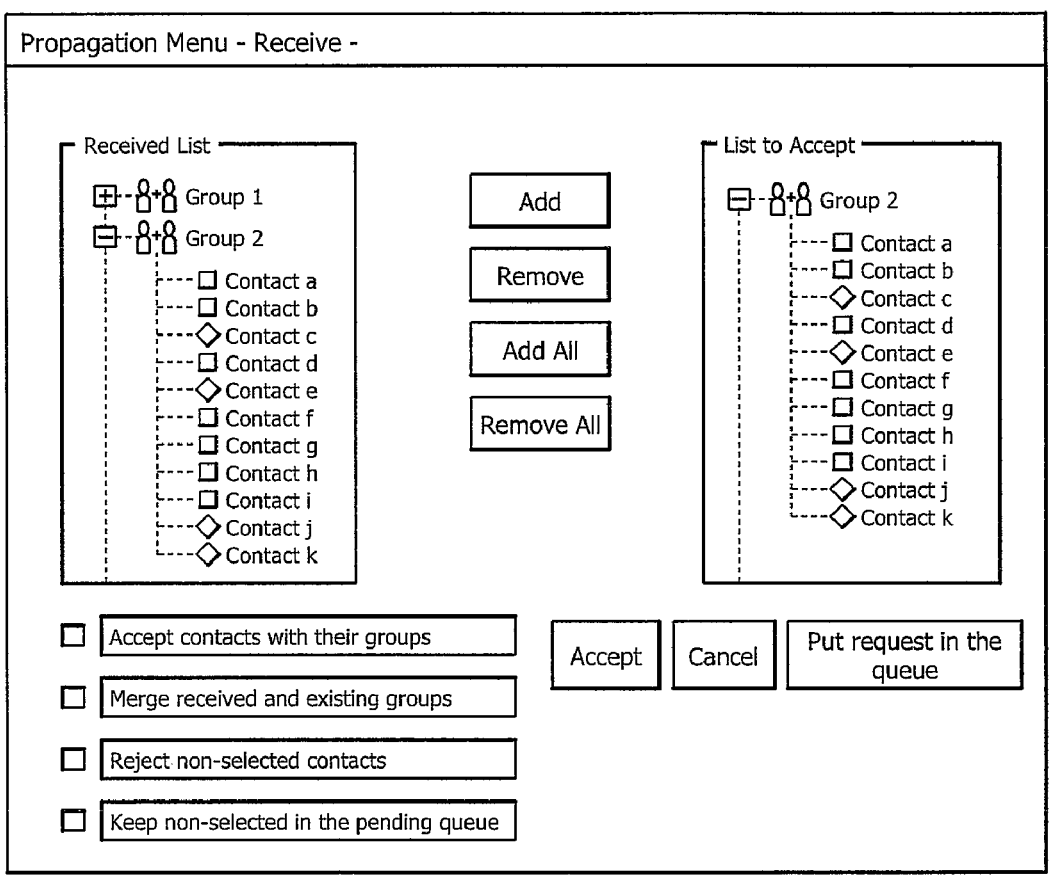
FIG. 8 depicts a GUI for selectively accepting contacts from a received IM buddy list.

In FIG. 7, the local user has more options in GUI 702. That is, as described above, the local user can selectively accept (button 704) or reject (button 706) each group and/or contact. Furthermore, the local user can put some or all of the contacts into a queue (button 708) for later processing (as described above). Clicking the "Advanced" button 710 takes the local user to another screen, such as that shown in FIG. 8 as GUI 802, in which other options are proffered.

As suggested by the different "Add" and "Remove" buttons, all or some of the various contacts and/or groups of contacts can be selectively added to the receiving user's IM buddy list. Furthermore, the user can "Accept contacts with their groups," in which entire groups of contacts are "block" accepted. Other options described above are also proffered to the receiving user.

As noted above, a notification may be sent to the receiving user when a propagated list of IM buddy contacts is received, particularly when the buddy list propagation is in response to a user changing projects, leaving his employment, etc. Such a "propagation event" results in conditions for a propagation rule being met, such that IM buddy list(s) are moved, deleted, etc. For example, assume that an employee quits working for a company. This "propagation event" may result in 1) his IM buddy list being auto-deleted and 2) that IM buddy list being auto-populated onto an IM buddy list of a co-worker (which may be his replacement). Of course, other similar types of propagation events may occur, including those described herein.

Figure 9:
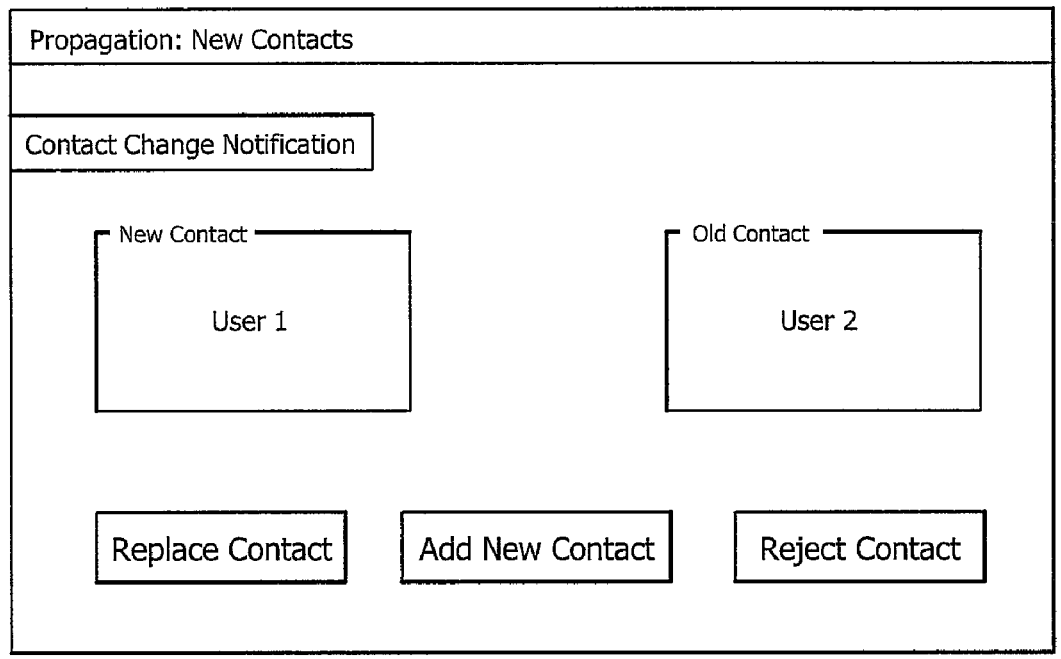
FIG. 9 illustrates a GUI that shows that a user has been replaced.

Referring now to FIG. 9, an exemplary GUI 902 shows a scenario in which a "User2" has moved from a current project. "User1" has replaced "User2." All users having "User2" in their contact list are notified of the change, and are presented with multiple options. As depicted, the notified users may 1) delete "User1" from their buddy list(s) and replace him with "User2"; 2) keep "User1" in their buddy list(s) and add "User2" to their buddy list(s); or 3) reject "User2" from being added to their buddy list(s).

Figure 10:
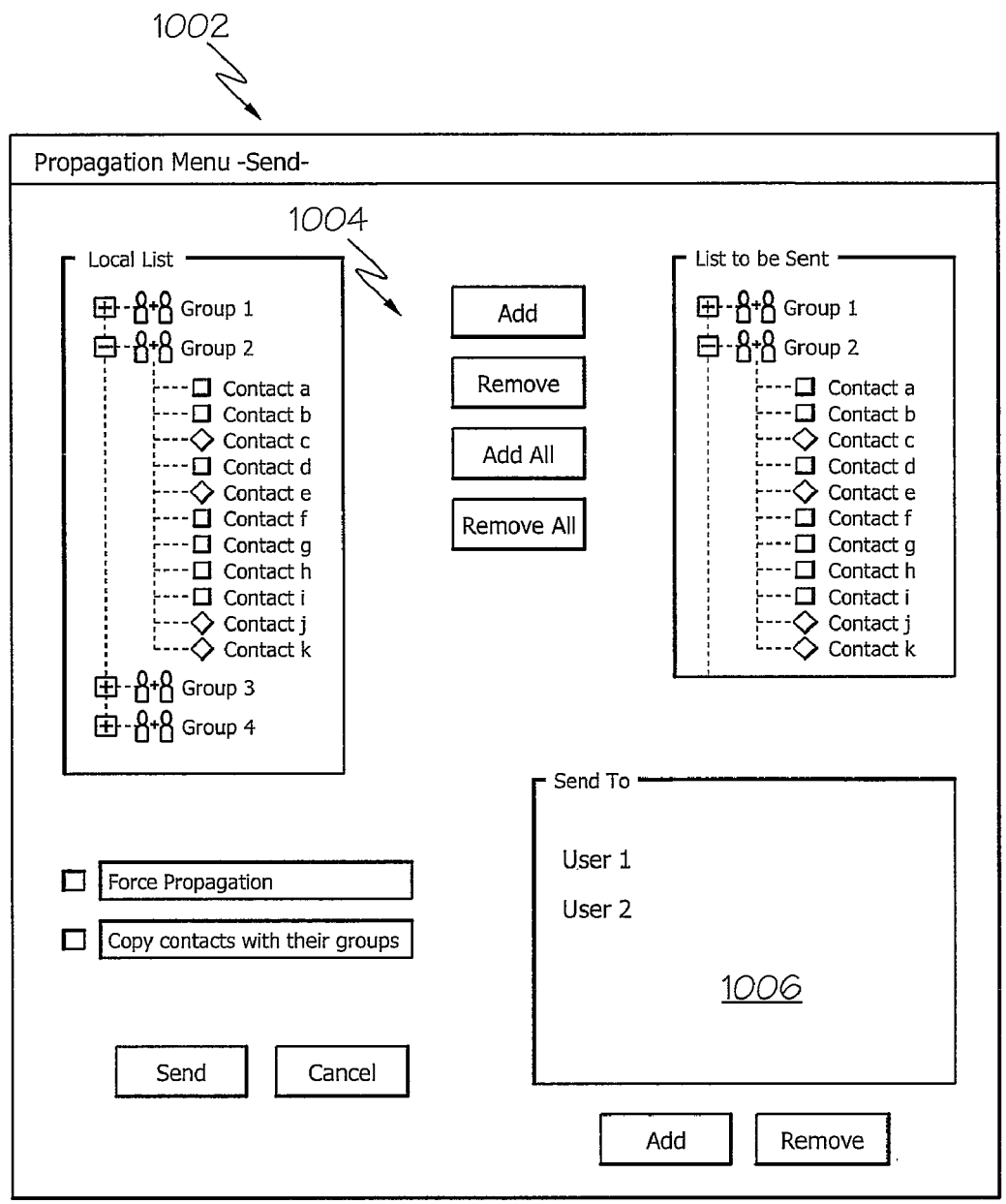
FIG. 10 depicts a GUI that describes sending options for sending an IM: buddy list.

Referring now to FIG. 10, an exemplary GUI 1002 presents an interface for sending IM buddy lists to other users. As suggested by the buttons 1004, a sender can selectively determine which contacts are to be sent to another user. The sending of these contacts can be forced upon the receiver (assuming that the sender has authority over the receiver to do so). Furthermore, contacts can be sent by group names (i.e., all contacts within a selected group are sent en masse to the receiver. The receiving user is selected (i.e., from a drop-down or pop-up menu—not shown) and pasted into window 1006. The selected groups/contacts are then sent to the selected users.

As described above, a system and method are presented for the autonomic and deterministic management of buddy lists in instant messaging communities and across gateways that bridge communities. The system and method described here allow for a buddy list to be propagated between peers in 1:1 and 1:N scenarios, as well as inherited (passively or forcefully) to/by an individual. In one embodiment, a manager is able to impose a buddy list to all of her team that is consumed by her team. In one embodiment, a first individual is able to solicit from another individual a buddy list (full, partial, selective). Buddy lists across the organization are kept in sync for a plurality of individuals who need to have the same buddy list, or a buddy list that contains a subset of individuals that is consistent. In one embodiment, buddy lists are automatically kept up to date when employees leave, when new employees are added, when organizations change, when individuals are promoted/demoted in an autonomic way, when an employee is no longer a liaison between an enterprise and a customer, etc. An employee (through policies) can inherit an automatic buddy list based on a predefined team that is stored centrally in one or more locations (e.g. all employees inherit the local personnel and IT support contacts). In one embodiment, an individual or a group of individuals is associated with a base buddy list that they can then expand (e.g. in the case of a new employee).

Note again that while most of the present disclosure describes examples of managing buddy lists in an Instant Messaging scenario, the same principals taught herein are applicable to other forms of interactive teleconferences, including but not limited to video conferences, web conferences, conference telephone calls, etc.

Note also that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for managing a buddy list for interactive teleconferencing, the method comprising:
    detecting a propagation event; and
    in response to detecting the propagation event, propagating a buddy list update from a first Instant Messaging (IM) client on a first computer to at least one second IM client on a second computer;
    wherein the interactive teleconferencing is Instant Messaging (IM); and
    wherein the first computer and the at least one second computer are coupled by an Instant Messaging (IM) server, the method further comprising:
    storing, in the IM server, historical data that describes the propagation of the buddy list update from the first IM client on the first computer to the at least one second IM client on the second computer, wherein the historical data comprises a record for the propagated buddy list update to indicate a second buddy list associated with the second IM client having been populated by an entire first buddy list associated with the first IM client.

2. The method of claim 1, wherein the propagation event is a change to a Service Level Agreement (SLA), wherein the at least one second computer is utilized by a customer whose service is defined by the SLA, and wherein the SLA defines which enterprise employees and customer employees are to be on a same buddy list.

3. The method of claim 1, wherein the propagation event is a change in hardware resources that requires an updating in buddy lists for purposes of servicing the hardware resources.

4. The method of claim 1, wherein the propagation event is a change in employment status of a user of the first computer.

5. The method of claim 4, wherein the change in employment status is a termination of employment for the user of the first computer.

6. The method of claim 4, wherein the change in employment status is a transfer to a new work group for the user of the first computer.

7. The method of claim 4, wherein the change in employment status is a promotion for the user of the first computer.

8. The method of claim 4, wherein the change in employment status is an initial hiring of the user of the first computer by an enterprise.

9. The method of claim 1, wherein the propagating of the buddy list update is forced upon the at least one second computer, wherein the at least one second computer is required to accept the buddy list update.

10. The method of claim 1, further comprising:
    monitoring a change in users of the at least one second computer; and
    in response to detecting the change in users of the at least one second computer, initiating the propagation event.

11. The method of claim 10, wherein the first computer and the at least one second computer are coupled by an Instant Messaging (IM) server, and wherein the change in users is monitored by the IM server.

12. The method of claim 1, wherein the at least one second computer is capable of accepting only a portion of the buddy list update that is propagated from the first computer.

13. The method of claim 1, further comprising:
    propagating a buddy list from the first computer to the at least one second computer; and
    placing the buddy list, which was propagated from the first computer to the at least one second computer, in a holding queue in the at least one second computer, wherein a user of the at least one second computer manually subsequently selects contacts from the holding queue for populating a local buddy list.

14. The method of claim 1, wherein the buddy list is transmitted as an attachment to an e-mail.

15. A system for managing a community buddy list for interactive teleconferencing, the system comprising:
    a computer programmed to operate a buddy list manager for detecting a propagation event; and
    a propagation logic in the buddy list manager for, in response to detecting the propagation event, propagating a community buddy list update from a first Instant Messaging (IM) client on a first computer to at least one second IM client on a second computer;
    wherein the interactive teleconferencing is Instant Messaging (IM); and
    wherein the first computer and the at least one second computer are coupled by an Instant Messaging (IM) server, the method further comprising:
    storing, in the IM server, historical data that describes the propagation of the buddy list update from the first IM client on the first computer to the at least one second IM client on the second computer, wherein the historical data comprises a record for the propagated buddy list update to indicate a second buddy list associated with the second IM client having been populated by an entire first buddy list associated with the first IM client.

16. An electronic storage device encoded with a computer program for managing a community buddy list for interactive teleconferencing, the computer program comprising computer executable instructions configured for:
    detecting a propagation event; and
    in response to detecting the propagation event, propagating a buddy list update from a first Instant Messaging (IM) client on a first computer to at least one second IM client on a second computer;
    wherein the interactive teleconferencing is Instant Messaging (IM); and
    wherein the first computer and the at least one second computer are coupled by an Instant Messaging (IM) server, the method further comprising:
    storing, in the IM server, historical data that describes the propagation of the buddy list update from the first IM client on the first computer to the at least one second IM client on the second computer, wherein the historical data comprises a record for the propagated buddy list update to indicate a second buddy list associated with the second IM client having been populated by and entire a first buddy list associated with the first IM client.

17. The electronic storage device of claim 16, wherein the computer executable instructions are deployable to a client computer from a server at a remote location.

18. The electronic storage device of claim 16, wherein the computer executable instructions are provided by a service provider to a customer on an on-demand basis.

19. The electronic storage device of claim 16, wherein the historical data further comprises a record of a first user within a user group being replaced by a second user added to the user group, and the propagated buddy list update indicates the first buddy list of the replaced first user being used to populate the second buddy list of the second user.

20. The method of claim 1, wherein the historical data further comprises a record of a first user within a user group being replaced by a second user added to the user group, and the propagated buddy list update indicates the first buddy list of the replaced first user being used to populate the second buddy list of the second user.

* * * * *